Dec. 6, 1949     F. J. SULLIVAN     2,490,558
QUICK RELEASE MECHANISM FOR PARACHUTE CARGO HARNESS
Filed Sept. 27, 1945     2 Sheets-Sheet 2
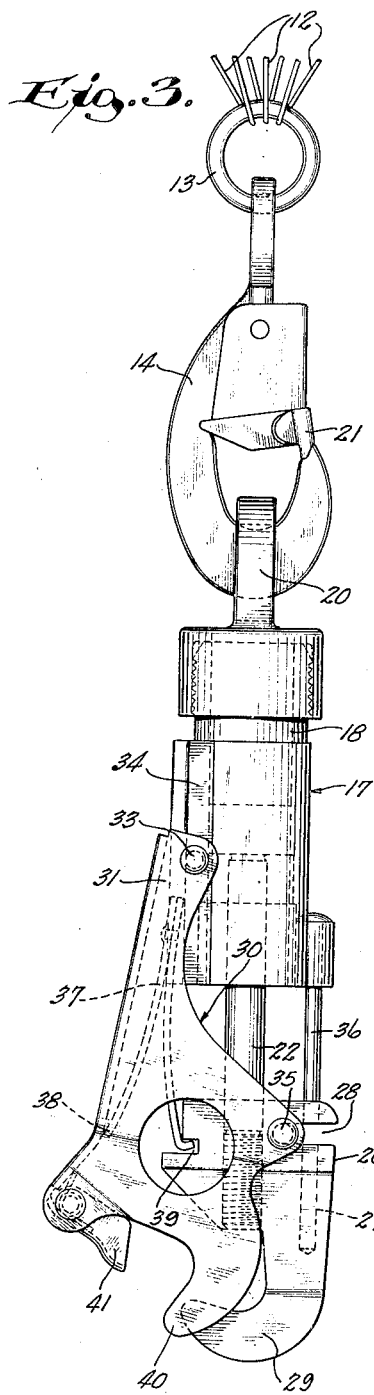
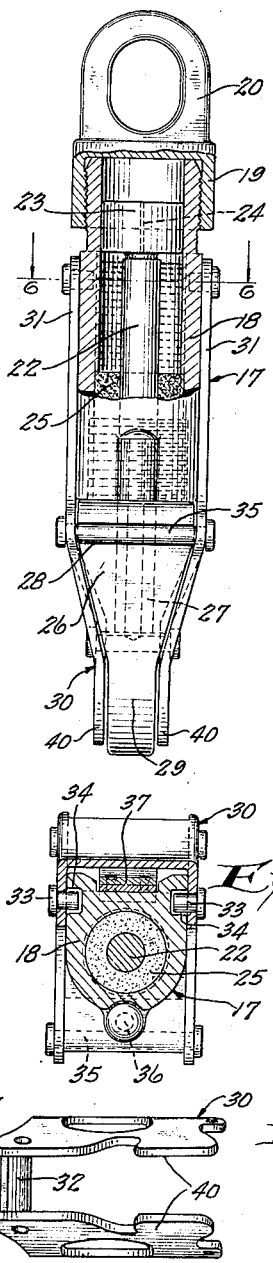
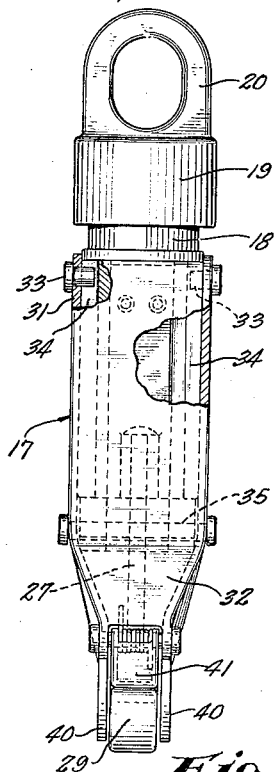
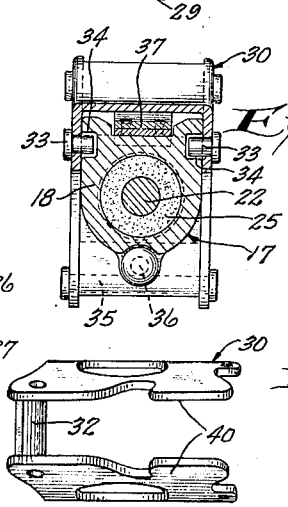
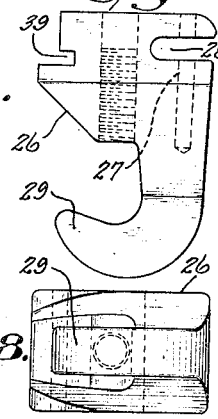
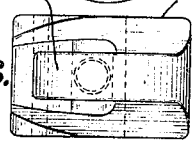
INVENTOR.
Frank J. Sullivan,
BY Morsell & Morsell
ATTORNEYS.

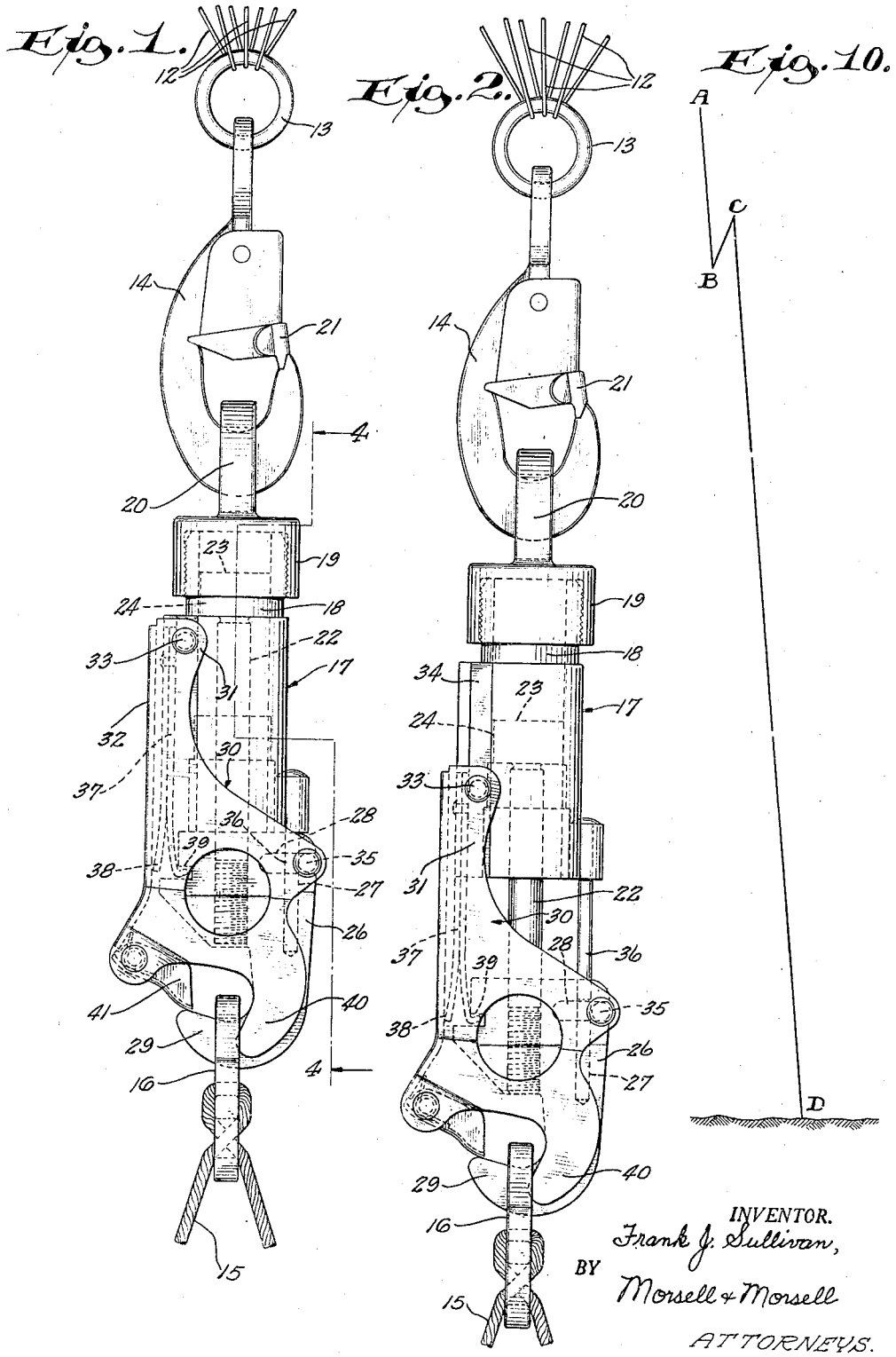

UNITED STATES PATENT OFFICE 2,490,558

QUICK RELEASE MECHANISM FOR PARACHUTE CARGO HARNESS

Frank J. Sullivan, Oshkosh, Wis.

Application September 27, 1945, Serial No. 618,953

4 Claims. (Cl. 294—83)

This invention relates to improvements in quick release mechanism for parachute cargo harness.

It is a common practice to use parachutes for dropping cargo, freight, packages or boxes of supplies, or other material from travelling airplanes to ground sites. It is desirable that when the descent of the parachute is terminated, the cargo or package be immediately released from the impediment of the attached parachute for the reason that if the parachute remains attached to the harness or rigging by which the cargo or package was suspended, subsequent movement, fouling or drifting of the parachute would drag the attached package or cargo therewith and might damage the same, especially if the terrain is rough and if the cargo load is of a fragile nature.

It is, therefore, a primary object of the present invention to provide a quick release mechanism for parachute cargo harness which will insure immediate automatic disengagement of the parachute from the cargo-carrying harness or rigging upon contact of the dropped cargo with the ground.

A further object of the invention is to provide a quick release mechanism for parachute cargo harness which serves to couple the cargo-suspending harness or rigging to the parachute shroud line ring and which will maintain a locked, closed condition in storage in an airplane, or elsewhere, and during the entire descent of the parachute and cargo, but which will open and disengage the cargo from the parachute immediately upon contact of the cargo with the ground.

In connection with the improved quick release mechanism of the present invention, there is consideration of and compensation for a phenomena of parachute operation. The improved quick release mechanism is designed to maintain a closed condition as long as there is a pull on the mechanism imposed by the weight of the load thereon during the period of descent, the mechanism further being such that when the pull of the load is relieved, due to the cargo contacting the ground, the mechanism will automatically open to shed the cargo-carrying harness from the parachute. When a parachute carrying a weight is ejected from an airplane, there is a period of descent prior to the opening of the parachute. When the parachute opens, a phenomena occurs which results in a substantial recoil which is of an extent to temporarily take the load off of the open parachute. During this period and prior to the subsequent normal descent of the open parachute, a quick release mechanism based on the sole theory of being permitted to automatically open upon relief from the weight of the load thereon would thereupon undesirably divest itself of the load at a high elevation from the ground. Because of the foregoing phenomena in parachute operation, any possibility of the improved quick release mechanism undesirably opening during the recoil of the opening parachute is effectively prevented by a hydraulic timing mechanism arranged so that the quick release mechanism parts cannot open until the lapse of a pre-determined time period sufficient to include the time for the initial descent of the closed parachute and the subsequent opening and recoil thereof.

A further object of the invention is to provide a quick release mechanism for parachute cargo harness, wherein the timed control for the release mechanism is put into operation by the pull imposed on the device through the weight of the load attached thereto.

A further object of the invention is to provide a quick release mechanism for parachute cargo harness arranged so that when the cargo hits the ground, pull on the fixture is abated and the fixture will not only open to release the cargo-carrying harness from the parachute, but the opening movement of the fixture is such as to actually divest or remove the harness-attaching member from the fixture.

A further object of the invention is to provide a quick release mechanism for parachute cargo harness which, after it releases the cargo harness, is still attached to the parachute shroud line ring and is ready for a subsequent setting and use.

A further object of the invention is to provide a quick release mechanism for parachute cargo harness which is automatic in its operation, which is simple and inexpensive to manufacture, which is strong and durable, which is foolproof, and which is well adapted for the purposes described.

With the above and other objects in view, the invention consists of the improved quick release mechanism for parachute cargo harness and its parts and combinations as set forth in the claims, and all equivalents thereof.

In the accompanying drawings in which the same reference characters indicate the same parts in all of the views:

Fig. 1 is a side view of the improved quick release mechanism for parachute cargo harness in its originally set and closed position, there being shown associated with the mechanism a portion of a cargo harness engaged thereby and the depending portion of a parachute;

Fig. 2 is a side view similar to the showing in Fig. 1 only showing the condition of the mechanism after the timing device has operated, putting the cargo harness engaging latch mechanism in condition to automatically open upon termination of the cargo pull on the latching hook;

Fig 3 is a view similar to Fig. 2 only showing the open position of the quick release mechanism which accomplished removal from the hook of the originally engaged cargo harness;

Fig. 4 is a longitudinal sectional view taken on line 4—4 of Fig. 1;

Fig. 5 is an edge view of the mechanism with parts broken away and in section;

Fig. 6 is a transverse sectional view taken on line 6—6 of Fig. 4;

Fig. 7 is a detail side view of the main hook portion of the mechanism;

Fig. 8 is a bottom view of the showing in Fig. 7;

Fig. 9 is a bottom view of the movable hook guard and load ejector of the mechanism; and Fig. 10 is a diagrammatic view illustrating a phenomena in parachute operation during the period of descent of a parachute from a traveling airplane to the ground.

Referring now more particularly to the drawing, it will appear that the converging lower ends of the shroud lines of a parachute are indicated by the numerals 12. Said ends of the parachute shroud lines are secured to and carry a ring 13 which, in turn, has depended therefrom a swivel hook 14. The suspending or attaching lines for a cargo harness or rigging are designated by the numerals 15, which lines are preferably hitched about and carry a metal attaching loop 16. The quick release mechanism of the present invention, which will be described more fully hereinafter, is interposed between the hook or attaching member 14 depending from the parachute shroud lines and the cargo harness attaching loop 16. Said mechanism, designated generally by the numeral 17, provides for the automatic and quick release of a cargo from a parachute after descent of the parachute from an airplane and immediately upon contact of the cargo with the ground.

The body portion of the quick release mechanism 17 includes a cylinder 18 whose upper end portion is externally threaded and is engaged by a closure cap 19 formed with an upwardly projected eyed portion 20 for engagement with the shroud-line-carried connecting hook 14, the latter having a latch 21 for the retention of the eyed portion 20 by the hook 14. Reciprocatably mounted axially within the cylinder 18 is a piston rod 22 formed at its upper end with a piston 23. In the piston 23 there is a side bleeder groove 24 affording direct fluid communication between the interior of the cylinder below the piston and the upper interior portion of the cylinder above the piston. In the uppermost position of the piston it is spaced from the inner wall of the cap 19 which forms the top of the cylinder chamber a distance of about ⅜ of an inch. In the raised position of the piston, the cylinder chamber below the piston is filled with an hydraulic fluid such as oil. In the lower portion of the cylinder chamber and tightly embracing the piston 22 is a "neoprene" packing bushing 25 for the purpose of preventing oil leakage. The lower end portion of the piston rod 22 is extended downwardly through the bottom end of the cylinder 18 and is screwed into the upper boss portion of a hook member 26.

The hook member 26 is shaped as is best shown in Figs. 7 and 8, the same being of substantial thickness and outwardly tapering from the hooked extremity, upwardly. In the rear side of the upper boss portion, the hook member is formed with a vertical socket or bore 27 which is intersected by a transverse, inwardly extending slot 28, the latter being open on the rear edge of the member. The reduced depending portion of the member 26 is curved and shaped to form a forwardly directed hook 29.

A hook guard or housing member is indicated generally by the numeral 30 and the same is of bifurcated formation with eccentrically shaped separated side wall portions which are generally upwardly outwardly inclined, as shown in Fig. 9. Said side wall portions have reduced upward extensions 31 and the front edge of the unit 30 is closed by a wall 32. In assembled relation the housing member 30 movably embraces the sides of the hook member 26 and is pivotally and vertically slidably mounted on the cylinder 18 by oppositely disposed, inwardly directed pins 33 extending into slots 34 therefor in the cylinder. Rear portions of the side walls of the unit 30 are joined by a transverse pin 35 which is adapted for back and forth travel in the hook slot 28. However, as will appear more fully hereinafter, movement of said pin 35 in the slot 28 and consequent swinging movement of the housing unit 30 is controlled by the position of a plunger 36 depending from a boss on the cylinder 17 and movable in the socket 27.

Fig. 1 illustrates the condition of the quick release mechanism after it has been set and prior to descent of the piston 23 within the cylinder 18. In this condition the lower hook unit 26 is held by the raised piston 22 relatively close to the lower end of the cylinder. The guard or housing unit 30 is in the closing relationship illustrated, and its transverse pin 35 is lodged within the outer end of the hook slot 28. With the parts thus arranged, the plunger 36 is in its fully seated position relative to the hook socket 27 and thus lodges rearwardly of the transverse pin 35 so as to lock the housing unit 30 in the closed condition illustrated.

Within the closed front end of the housing member 30 there is anchored a double band spring 37 whose depending leg portions have a tendency to separate, one such terminal portion forcefully bearing against the closing wall 32 of the unit 30, as at 38, and the other terminal portion being angled inwardly and engaged within a recess 39 therefor in the hooked member 26. Hence, the arrangement of the spring 37 is such as to normally urge the housing unit 30 toward the out-swung position of Fig. 3, relative to the hook member 26, but in the condition of the parts represented in Fig. 1 such movement is prevented by the down position of the plunger 36 in its socket 27, holding the transverse pin 35 of the housing unit in the outer end of the slot 28.

When the parts are in the closed condition shown in Fig. 1, spaced curved fingers 40 on the unit 30 are disposed rearwardly relative to the hooked extremity 29 of the unit 26 and do not interfere with the mounting on said hooked extremity 29 of the attaching device 16 for the cargo harness or rigging. It will be noted from Fig. 1 that the arrangement of the parts is such as to form an enclosed space above the hooked extremity 29 to accommodate projecting portions of the attaching loop 16, with peripheral portions of the lower portion of the unit 30 cooperating and forming the enclosure, together with a spring latch 41 mounted in the lower forward end of the unit 30.

The mechanism is originally set in the condition illustrated in Fig. 1 with the cargo supporting harness engaged on the hook 29. When a parachute, which is to drop a cargo or package, is thrown from an airplane travelling at a high elevation, it is, of course, contemplated that there will be a period of descent prior to the opening of the parachute. With reference to the diagrammatic showing in Fig. 10, the line A—B represents the period of descent of the parachute and the attached load upon ejection of the same from the airplane and prior to the opening of the parachute. If it be assumed that the parachute opens at point B, the line B—C represents a phenomena which then occurs, i. e. a substantial recoil or upward bouncing action during which period the steady downward pull or weight of the load on the parachute may be relieved or temporarily overcome. Following the opening of the parachute and the period of recoil and readjustment represented by line B—C, the parachute with its suspended load will thereafter descend slowly in a normal manner, and during this period of normal descent, the load will exert a steady pull on the parachute. The last-mentioned period of descent is represented in Fig. 10 by the lines C—D, D indicating the descent termination at which time the load or cargo strikes the ground.

Considering the above explanation and observing that the mechanism is initially in the set condition of Fig. 1, the reason for the hydraulic timing mechanism which comprises the oil-filled cylinder 18 and the piston 23 will be apparent. During the period represented by line A—B in Fig. 10, the load, of course, exerts a downward pull on the mechanism which reacts on the piston rod 22 to force the piston 23 downwardly in its cylinder. This pull on the piston rod and piston will slowly displace oil in the lower portion of the cylinder to the upper portion of the cylinder via the bleeder groove 24 in the piston, such displacement being relatively slow so as to permit only a slow downward movement of the piston rod and piston. The parts are so arranged and timed that the piston 23 cannot reach its fully lowered position until substantially after the phenomena represented by a line B—C in Fig. 10 has occurred and the parachute and load is then dropping normally as represented by line C—D with a constant steady pull or load being imposed on the hook member 26 which is transmitted through the connected piston rod 22 to the piston 23. In the predetermined time period permitted by the slow displacement of oil in the cylinder and the downward travel of the piston 23, the lower unit 26 of the mechanism will ultimately separate from the upper cylinder-carrying unit to the extent shown in Fig. 2, in which position the cylinder-carried plunger 36 rises relative to the socket 27 to an extent to unblock the slot 28 in the hook 26. However, the tension exerted by the double band spring 37 in a direction to urge the housing unit 30 to its pivoted open position is considerably less than the force exerted by the cargo load reacting on the hooked extremity 29 and bearing against the finger extensions 40 of the housing unit 30 which thereby holds and retains the housing unit in the closed position of Fig. 2.

Immediately upon the termination of the descent of the parachute and its attached cargo load, as represented at D in Fig. 10, the cargo load strikes the ground and its load is removed from the hooked extremity 29 of the mechanism. With the load thus relieved, the tension of the spring 37 becomes sufficient to urge the housing unit 30 toward its outwardly pivoted open position, illustrated in Fig. 3. In so moving the curved surfaces of the lower end of the unit 30 become effective to push and eject the load-attaching loop 16 from the then open extremity of the hook portion 29. Pivotal movement of the unit 30 toward its open position is permitted because the plunger 36 is then elevated above the slot 28 and the transverse pin 35, carried by the housing unit, is free to ride inwardly in the slot 28, as in Fig. 3.

It will thus be apparent that immediately upon contact of the cargo load with the ground, the quick release mechanism becomes effective to open the hooked end of the mechanism and to actually eject from engagement with the hook the load-attaching member. The hydraulic timing mechanism does not permit the parts to become positioned so that an opening movement is possible until after there has been a sufficient period of descent of the parachute to attain the normal slow downward movement of the open parachute. With the cargo load being automatically divested of the parachute upon contact of the cargo load with the ground, it is obvious that the load will remain where it is dropped and will not be carried or bumped along the ground from place to place by subsequent drifting or moving of the parachute. Consequently, the possibility of damage to the grounded cargo is minimized and it is available for use by persons on the ground who were awaiting the airplane carried cargo.

During descent of a parachute with a substantial load suspended therefrom, it is, of course, obvious that the harness suspended load may have a tendency to spin or twist, and such tendency might cause the attaching loop 16 to undesirably twist or work loose relative to the outer end of the hooked portion 29 and the spring latch 41. However, this contingency is prevented in the present improvements because any twisting or turning action on the attaching loop 16 will cause said loop to bear diagonally against the rigid surfaces of the enclosing edges of the member 30 and the latch 41 and there cannot be such movement of the member 16, therefore, which might momentarily take the downward pull off of the hook 29 and removed from the portions 40 of the member 30 to an extent which might permit the member 30 to snap to open position.

From the foregoing description, it will be seen that the quick release mechanism for parachute cargo harness is of simple and novel construction, will positively retain a load suspended therefrom until the load contacts the ground, and will thereupon immediately open and actually divest itself of the attached load. The mechanism is simple to set and connect between related portions of a parachute and a cargo harness, and is well adapted for the purposes set forth.

What is claimed as the invention is:

1. In combination, a support, a hooked member longitudinally movably carried by the support, a connector removably carried by said hooked member and adapted to have a load suspended therefrom, a latch member movably mounted on the support to open and close the hooked member, means controlled by a receded position of the hooked member relative to the support for locking the latch member in closed position, timed means controlled by a projected position of the hooked member relative to the support for automatically releasing said locking means, the association of said members and means being such that the force of a load suspended from the engaged connector will maintain the latch member in its closed position after release of said locking means, and means for subsequently moving the latch member to open position operative upon relief of the force of the load on said hooked member.

2. In combination, a support, a hooked member reciprocatably carried by the support, a connector removably carried by said hooked member and adapted to have a load suspended therefrom, a latch member pivotally and reciprocatably movably mounted on the support and engaged with the hooked member to open and close the latter relative to the connector and to follow the reciprocations of the hooked member relative to the support, means for locking the latch member in closed position, timed means dependent upon outward reciprocation of the hooked member relative to the support for automatically releasing said locking means, and whose action is initiated by the force of a load suspended from the connector and reacting on the hooked member, the association of said members and means being such that the force of a load suspended from the engaged connector will maintain the latch member in its closed position after release of said locking means, and means for subsequently moving the latch member to open position operative upon relief of the force of the load on said hooked member.

3. In combination, a hooked member, a connector removably carried by said hooked member and adapted to have a load suspended therefrom, a latch member movably associated with the hooked member to open and close the latter relative to the connector, means for initially locking the latch member in closed position, timed, hydraulic means initiated by the force of a weight reacting on said hooked member for automatically releasing said locking means, the association of said members and means being such that the force of a load suspended from the engaged connector will maintain the latch member in its closed position after release of said locking means, and spring means for automatically opening the latch member and ejecting the connector from the hooked member upon relief of the force of a load reacting on the hooked member and after release of said locking means.

4. In combination, a timing member carrying a lock pin, a hooked member longitudinally movably carried by the timing member and formed with a lock pin socket and a slot thereadjacent, a connector removably carried by said hooked member and adapted to have a load suspended therefrom, a latch member slidably and pivotally mounted on the timing member to open and close the hooked member relative to the connector, said latch member having a stop projection movable in said hooked member slot, lodgement of said lock pin in said socket and adjacent the stop projection of the latch member, when the latter is in closed position, serving to lock the latch member in the latter position, the pull imposed by a load suspended from said hooked member serving to longitudinally separate the hooked and timing members to withdraw the lock pin from the socket whereby the latch member stop projection is free to travel in the hooked member slot to permit opening movement of the latch member, the association of said members and means being such that the force of a load suspended from the engaged connector will maintain a latch member in its closed position after separation of the hooked and timing members and withdrawal of the lock pin, and spring means for automatically opening the latch member upon relief of the force of a load reacting on the hook member after longitudinal separation of the hooked and timing members.

FRANK J. SULLIVAN.

REFERENCES CITED

The following references are of record in the file of this patent:

UNITED STATES PATENTS

| Number | Name | Date |
| --- | --- | --- |
| 1,994,646 | Heath | Mar. 19, 1935 |
| 2,131,445 | Lawton | Sept. 27, 1938 |
| 2,386,932 | Cooper | Oct. 16, 1945 |
| 2,422,839 | Maskey | June 24, 1947 |

FOREIGN PATENTS

| Number | Country | Date |
| --- | --- | --- |
| 670,463 | France | Aug. 19, 1929 |
| 118,090 | Australia | Feb. 2, 1944 |